Figure 1:
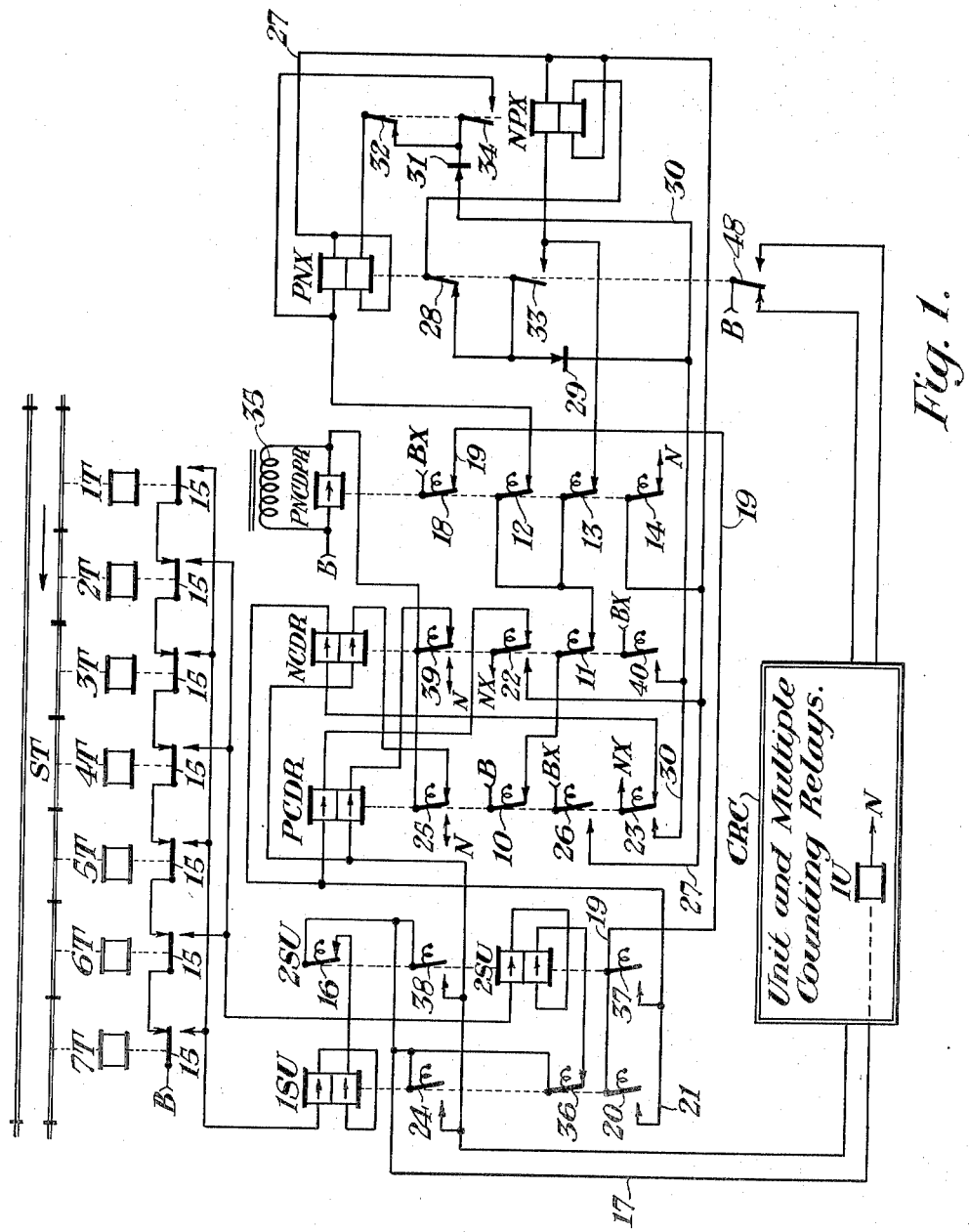

INVENTOR.
Sih Hsuin Tsiang.
BY W. H. Stout
HIS ATTORNEY.

United States Patent Office 2,763,775
Patented Sept. 18, 1956

2,763,775

ALTERNATING CURRENT CYCLE REPEATER FOR TIME MEASURING MEANS

Sih Hsuin Tsiang, Pittsburgh, Pa., assignor to Westinghouse Air Brake Company, Wilmerding, Pa., a corporation of Pennsylvania Application December 29, 1952, Serial No. 328,389

10 Claims. (Cl. 246—108)

My invention relates to an alternating current cycle repeater for time measuring means. More particularly, my invention relates to an improved method of measuring time using an alternating current cycle repeater as disclosed in Letters Patent of the United States No. 2,320,802, issued June 1, 1943, to Clarence S. Snavely, for Railway Braking Apparatus.

The principal object of the invention disclosed in said Patent No. 2,320,802 is the provision of an automatic control of the braking action of a car retarder in accordance with the speed of a car passing through said retarder. A secondary, and necessary, object of said invention is an improved timing means for measuring the speed of a railway car passing over a stretch of railway track by measuring the time consumed by the car in passing through a section of track of a known length.

In the timing means disclosed in the previously mentioned invention, the time consumed by a car in moving through a track section is determined by counting the cycles of an alternating current by a counting relay chain. The counting relay chain is activated by a pair of half step relays which alternately operate on alternate half cycles of the alternating current. The possible variation of a recorded time interval, as compared with the theoretical ideal measurement, may be as much as plus or minus two half cycles of the alternating current. Thus, the recorded value of two otherwise identical time intervals may vary from each other by as much as four half cycles. The extent of the error in any given operation depends upon the actual cutoff point in the last prior operation, as will be more fully explained hereinafter, and how the first cycle in the counting operation is split in getting the counting relays into action. When the normally accepted standard frequency of 60 cycles per second is used, this maximum possible error becomes approximately 33 milliseconds. With the short track sections associated with car retarders, this error at 4 miles per hour is slightly less than six and one-half per cent of the measured time and, up to speeds of 10 miles per hour, does not become prohibitive.

However, in order to accurately measure the speeds of faster moving vehicles, not necessarily limited to railway cars moving through a car retarder, even though the distance over which the speed is measured is increased, the possible error should be reduced as low as possible, with the practical limit being a one-half cycle loss of time. If the delay in starting the counting chain can be kept to one cycle or less, the error when using the frequency of 60 cycles per second will then be less than 17 milliseconds.

An object of my invention is to provide means to increase the accuracy of the method of measuring time by counting the cycles of an alternating current.

Another object of my invention is to provide an improved timing means for measuring the speed of a vehicle passing through a fixed distance.

A further object of my invention is to provide a more accurate timing means for use with a system for automatically controlling the braking force in a car retarder according to the speed of a railway car passing through this retarder.

A feature of my invention in accomplishing the above objects is the provision of circuit means including a relay or relays to reset a pair of half-step timing relays to an initial position after each period of operation and to apply an alternating current for timing purposes to these half-step relays in such a manner that operation starts always within a complete cycle of the alternating current, and that a particular one of the pair of relays always operates first.

Other objects and features of my invention will be apparent from the description which follows taken in connection with the accompanying drawings.

I shall describe two forms of apparatus embodying my invention and shall then point out the novel features thereof in claims.

In the accompanying drawings, Fig. 1 is a diagrammatic view showing one form of apparatus embodying my invention.

Figure 2:
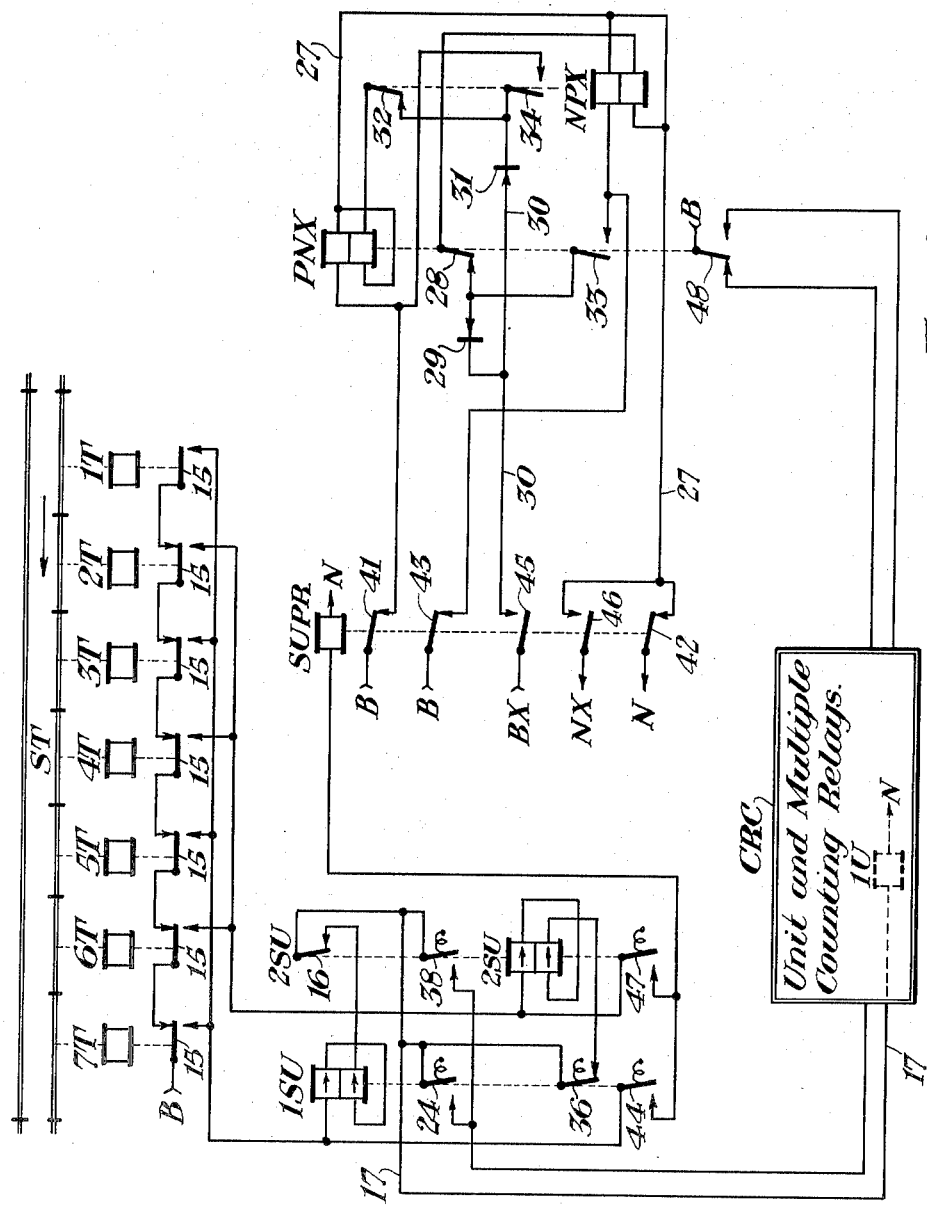

In the accompanying drawings, Fig. 2 is a diagrammatic view showing another form of apparatus embodying my invention.

Similar reference characters refer to similar parts in both views.

In each drawing, there is represented apparatus for successively measuring the speed of a railway car as it passes through a stretch of railway track, such as a car retarder or similar unit.

The stretch of track is represented at the top of each drawing by the reference character ST and is shown divided into seven consecutive track sections, each provided with a track circuit. Traffic normally moves in the direction indicated by the arrow. The relays in the upper portion of each drawing, 1T to 7T inclusive, represent track relays for the series of seven track circuits within the said stretch, a dotted line indicating the track section with which each relay is associated. The track circuits are not shown in detail as they form no part of my invention and may be of any usual and well-known type. It is herein assumed that they are of the type shown in the copending application for Letters Patent of the United States, Serial No. 283,931, filed April 23, 1952 by David P. Fitzsimmons, for Railway Car Speed Determining and Control Apparatus, now Patent No. 2,751,492, issued June 19, 1956. Therefore, each of the relays 1T to 7T, inclusive, is normally energized by its track circuit and becomes deenergized and releases when a car occupies the track section with which it is associated.

While in both drawings the apparatus embodying my invention is shown used for repeatedly measuring the speed of a railway car at a car retarder, this is by way of illustration only as there are many other places this apparatus can be used. Hence it is to be understood that the invention is not limited to measuring the speeds of railway cars and that it can be used to measure the speed of other vehicles moving over other trackways. Furthermore, while seven consecutive track sections are shown, the invention is not limited to any particular number of measuring track sections, and only one section or a relatively large number of sections could be provided.

The relays 1SU and 2SU shown in the left-hand portion of each drawing are used to start or initiate the action of the cycle repeaters and will be referred to normally as the "initiating" relays. In the apparatus as shown, relay 1SU operates in response to the release of the odd numbered track relays 1T, 3T, 5T and 7T, while relay 2SU correspondingly operates in response to the release of the even numbered track relays 2T, 4T and 6T, as will be explained hereinafter. While here shown as two relays, the initiating relay means may be a single relay in other types of installations using the apparatus embodying my invention to measure the speed of vehicles under different conditions.

The relays 1SU and 2SU are shown as biased relays, but they may be relays of the ordinary neutral type. The control circuits for these relays form no part of my invention but are shown for the purpose of providing a clear understanding of the operation of the apparatus. The circuits as shown are a form of the control circuits for these relays as shown in the aforementioned Patent No. 2,751,492.

Similarly the cycle repeater relays PNX and NPX, which are half-step relays of the magnetic stick type, and their associated circuit means, are identical with the cycle repeater relays and circuits shown in the aforesaid Letters Patent No. 2,320,802. Therefore, this arrangement forms no part of my invention. Details of their operation are included in this description in order to make clear the operation of my invention. The arrangement for these relays is such that when current flows in either or both windings of either relay from left to right the relay armature will be moved to the normal or left-hand position as viewed in the drawing, closing normal contacts, and when current flows in either or both windings of either relay from right to left the relay armature will be operated to the reverse or right-hand position, closing reverse contacts.

In each drawing, the system is provided with a source of direct current, not shown, but having its positive and negative terminals indicated by the reference characters B and N, respectively. Similarly, a source of constant frequency alternating current is provided having its terminals indicated by the reference characters BX and NX. These terminals alternately have a positive and a negative polarity with each alternate half cycle of the alternating current. That is, when terminal BX has a positive polarity, terminal NX will have a negative polarity; and in reverse, when terminal BX is negative, terminal NX will be positive. The term "positive half cycle," as used herein, will refer to the half cycle of the alternating current during which terminal BX has positive polarity; conversely, the term "negative half cycle" will refer to the half cycle during which the terminal NX has the positive polarity. It will be assumed throughout the following description that current flows from the positive to the negative terminal of the source of energy, through whatever series of wire leads, contacts, and relay windings is being discussed. This is the usually accepted direction of current flow. Therefore, current will flow from terminal B to terminal N of the direct current source. Also, instantaneous current from the alternating current source will flow from whichever terminal, BX or NX, has at that instant the positive polarity to the other terminal which will be negative. During a "positive half cycle," for example, current flows from terminal BX through the circuit to terminal NX.

Referring now particularly to Fig. 1, the apparatus which embodies my invention is shown in the center of the drawing, and comprises a positive cycle detector relay PCDR, a negative cycle detector relay NCDR, and a repeater of either of these two relays, the relay PNCDPR. Also, my invention further comprises the circuit means by which these relays are controlled, and by which they control the cycle repeater relays, shown in the right-hand portion, to make the cycle repeaters responsive to the initiating relays, shown in the left-hand portion, and to the alternating current. Relays PCDR, NCDR, and PNCDPR are all of the biased type. Thus they will operate their armatures to close their normal or left-hand contacts when current flows through either winding, or both windings, in the direction indicated by the arrow. When deenergized, or when energized by current flowing in the direction opposite to the arrows, the relay armatures are operated to close reverse, or righthand contacts.

The apparatus is shown in its inactive or non-measuring position, that is, its position when no railway car occupies any of the track sections of the stretch ST. Since relays 1SU, 2SU, PCDR, NCDR, and PNCDPR are all of the biased type, and since they are all deenergized when the apparatus is not measuring, the armatures of all these relays are in their reverse positions, that is, the biased right-hand positions as viewed in Fig. 1. When the system is returned to its inactive state at the end of each period of operation, direct current energy is supplied through a circuit passing from terminal B of the source over reverse contact 10 of relay PCDR, reverse contact 11 of relay NCDR, reverse contact 12 of relay PNCDPR and the upper winding of relay PNX in multiple with reverse contact 13 of relay PNCDPR and the upper winding of relay NPX, wire 27, and reverse contact 14 of relay PNCDPR to terminal N of the source. The direction of this current through the windings of both relay PNX and relay NPX is from left to right so that these relays operate their armatures to their normal position or hold their armatures in their normal position if already occupying it. This action assures that these relays will be in a selected initial position, that is, normal contacts closed, prior to the start of any period of time measuring.

In the arrangement shown in the previously mentioned Patent 2,320,802, the corresponding relays are not reset at the end of each period of operation but remain in the final position to which operated. Thus either the normal or reverse contacts of either relay may be closed when the next period of operation begins. In other words, the initial positions of the contacts of these relays may be any one of four possible combinations. Since the first half cycle of the alternating current may be either positive or negative, depending on the instant that the circuit is closed, there are eight possible initial conditions which may exist at the beginning of a period of time measuring. In the sequence of operation between these cycling relays and the relays of the counting chain, the critical period during which error develops is that period between the closing of the alternating current circuit to the cycling relays and the picking up of relay 3U of the counting chain. Under one initial condition, this period is only two half cycles of the alternating current in length, while under a second initial condition, the similar period becomes six half cycles in length. The length of the period under the remaining six possible initial conditions varies between these two extreme limits. Ignoring any initial portion of a half-cycle during which no relay operation occurs, the time recorded by the arrangement of the reference patent may thus be in error by as much as four half cycles, or two cycles, of the alternating current, or approximately 33 milliseconds if an alternating current having a frequency of 60 cycles per second is used. By resetting these cycling relays at the end of each period of operation so that the initial position of the contacts is always the same, part of the possible error is eliminated, as will be described hereinafter. Such error as remains is a nearly constant value, so that the results can be compensated.

To measure the speed of a car as it passes through a section of the stretch of railway track ST, the pair of half step relays PNX and NPX must operate in combination as an alternating current cycle repeater, from the time the leading pair of wheels of the car enter the section until these wheels leave the section. The operation of one of these relays will be counted and recorded in the counting relay chain unit CRC. As the track circuit of a section is shunted by this leading pair of wheels, one of the initiating relays 1SU or 2SU, which are responsive to the release of either an odd or even numbered track relay, respectively, will operate and apply both alternating and direct current energy to the cycle detector relays. Depending on whether the initial half cycle of the alternating current is positive or negative, either relay PCDR or NCDR, respectively, will operate its armature to its normal position. The operated relay, together with the repeater relay PNCDPR will then stick in this normal position energized by direct current energy.

Operation of either relay PCDR or relay NCDR, with relay PNCDPR, will remove the direct current energy which reset relays PNX and NPX to their normal position at the end of the last period of operation, as previously described, and will apply alternating current energy to these two half step relays. This alternating current energy will be so poled as to cause relay PNX to begin to operate on the second half cycle of the alternating current, regardless of its relative polarity. The pair of relays will continue to operate, then, on alternate half cycles of the alternating current until the period of time measuring ends. At the end of the period, the release of the initiating relay, with the resultant release of the cycle detector relay and its repeater, removes the alternating current energy and reapplies the direct current energy to reset relays PNX and NPX to their normal position.

Let us now assume that a railway car enters the stretch of railway track ST, previously mentioned, particularly the first section of said stretch, so that the track circuit for that section is shunted and relay 1T is de-energized. When relay 1T releases and closes its back contact, direct current energy is supplied through a circuit passing from terminal B of the source over front contacts 15 of relays 7T to 2T, inclusive, back contact 15 of relay 1T, through both windings of relay 1SU in series and from left to right in both windings, reverse contact 16 of relay 2SU, and wire 17 to the various contacts and circuits in the unit and multiple counting relay chain CRC, and finally through winding of relay 1U to terminal N of the source. The counting relay chains CRC which comprise the unit and multiple counters are identical with those disclosed in said Letters Patent of the United States No. 2,320,802, and, since they are not part of my invention, are not shown in detail. The operation of these counting relays does not add to the novelty of operation of the apparatus shown in either drawing and mention of them will be made only as they are operated in conjunction with the said apparatus, reference being made to Patent No. 2,320,802, for a full description of such counting relay chains.

The direct current which flows through the circuit as just described is of the proper direction through the windings of relay 1SU to cause this relay to operate its armature to its normal position closing its normal or left-hand contacts. Alternating current energy is then supplied to relays PCDR and NCDR from terminal BX of the source over reverse contact 18 of relay PNCDPR, wire 19, normal contact 20 of relay 1SU, wire 21; then through both of two circuits in multiple, the first comprising the upper winding of relay PCDR from left to right and reverse contact 22 of relay NCDR to terminal NX of the source, and the second comprising the upper winding of relay NCDR from right to left and reverse contact 23 of relay PCDR to terminal NX of the source. If we assume that the normal contacts of relay 1SU close during the initial part of a "positive half cycle" of the alternating current, the direction of current in the circuits described will be from terminal BX to terminal NX and will be such as to cause relay PCDR to operate its armature to close its normal contacts, but will retain relay NCDR in its reverse position.

Operation of relay PCDR completes a stick circuit for that relay so that direct current flows from terminal B of the source over front contacts 15 of relays 7T to 2T, inclusive, back contact 15 of relay 1T, the windings of relay 1SU, reverse contact 16 of relay 2SU, normal contact 24 of relay 1SU, the lower winding of relay PCDR from left to right, reverse contact 39 of relay NCDR, and normal contact 25 of relay PCDR to terminal N of the source. The direction of this current is such as to retain relay PCDR in its normal position. Beginning at normal contact 24 of relay 1SU, a circuit in multiple with the latter part of the stick circuit for relay PCDR, just described, extends to the unit and multiple counting relay chains CRC, but, as mentioned heretofore, the operation of these counting relay chains is not part of my invention and will not be described. Operation of relay PCDR also completes a circuit which can be traced from terminal B of the source through the winding of relay PNCDPR from left to right and normal contact 25 of relay PCDR to terminal N of the source. Since the direction of flow of this direct current in the winding of relay PNCDPR is with the arrow, the relay PNCDPR operates its armature to its normal position.

The operation of relay PCDR opens the previously described direct current reset circuit for relays PNX and NPX at reverse contact 10 of relay PCDR, but since relays PNX and NPX are of the magnetic stick type no immediate action occurs. The circuit for supplying alternating current energy to relay NCDR is also opened at reverse contact 23 of relay PCDR, to prevent any operation of relay NCDR during the present period of time measuring.

Operation of relay PNCDPR to its normal position further opens the direct current reset circuit for relays PNX and NPX at reverse contacts 12, 13 and 14, respectively, of relay PNCDPR. This effectively prevents any "tie-in" or "run-around" circuit between the direct current and the alternating current sources by removing both terminals B and N of the direct current source from the circuits. The alternating current energizing circuits for both relay PCDR and NCDR are opened from terminal BX at reverse contact 18 of relay PNCDPR. Relay PCDR, having detected that the initial half cycle alternating current was a "positive half cycle," is thus removed from the control of the alternating current and is held in the normal position by direct current energy over its stick circuit, previously described.

During the remainder of the initial half cycle, if any time is left, current flows in a circuit which may be traced from terminal BX of the source (positive since this is a "positive half cycle") over normal contact 26 of relay PCDR, wire 27, the lower winding of relay NPX from left to right, normal contact 28 of relay PNX, rectifier 29 which is poled to pass current in this direction, wire 30, and normal contact 23 of relay PCDR to terminal NX of the source. However, since the direction of this current is from left to right through the lower winding of relay NPX, this relay is held in its normal position and no action occurs. This current is kept from the lower winding of relay PNX by rectifier 31 which is poled so as to block current of this direction.

However, during the next or second half cycle, which is a "negative half cycle," current flows in a circuit passing from terminal NX of the source over normal contact 23 of relay PCDR, wire 30, rectifier 31 in its forward direction, normal contact 32 of relay NPX, the lower winding of relay PNX in the direction right to left, wire 27, and normal contact 26 of relay PCDR to terminal BX of the source. The current through the lower winding of relay PNX is of the proper direction, right to left, to cause this relay to operate its armature to its reverse position, where it stays because of its magnetic stick characteristics.

The closing of reverse contact 48 of relay PNX causes the second relay in the unit timing chain CRC to operate by direct current energy applied from terminal B of the source over reverse contact 48 of relay PNX. The first relay in this chain, relay 1U, was energized in series with relay 1SU and picked up at that time. Each time relay PNX operates, a successive relay in the unit timing chain is energized by direct current energy supplied over either normal or reverse contact 48, alternately, of relay PNX. Since as will be shown hereinafter, relay PNX is always the first of the pair of relays PNX and NPX to be operated and since it always operates on the second complete half cycle, the counting process is continued during the second complete half cycle after the timing operation is initiated.

During the third half cycle, another "positive half cycle," alternating current energy is supplied through a circuit extending from terminal BX of the source over normal contact 26 of relay PCDR, wire 27, the upper winding of relay NPX, reverse contact 33 of relay PNX, rectifier 29 in its forward direction, wire 30, and normal contact 23 of relay PCDR to terminal NX of the source. Since the direction of flow of the current is from right to left through the upper winding of relay NPX, this relay operates its armature to its reverse position, and sticks in that position.

On the next half cycle of the alternating current, current flows from terminal NX of the source over normal contact 23 of relay PCDR, wire 30, rectifier 31 in its forward direction, reverse contact 34 of relay NPX, the upper winding of relay PNX, wire 27, and normal contact 26 of relay PCDR to terminal BX of the source. Here the current is from left to right through the upper winding of relay PNX and this relay operates its armature to its normal position.

During the next succeeding half cycle, alternating current energy is supplied to relay NPX over the circuit previously described for the first half cycle and now the flow of current through the relay winding causes the relay to operate its armature to its normal position.

This completes one cycle of the operation of the pair of half step relays which repeat the alternating current cycles for timing purposes. The operation continues in a similar manner as long as the leading pair of wheels of the railway car occupies the first section of track so that relay 1T remains down and relay 1SU remains normal. The relays of the counting chain are picked up one after the other so that the time the car consumes in moving through the first section of track is registered by the number of relays of the chains that are picked up.

The preceding description of the operation of the apparatus was based on the assumption that the first half cycle of alternating current after the initiating relay 1SU closed its front contacts was positive. If the first half cycle is negative, the operation of the apparatus is similar to that just described and will be included in the following description in conjunction with the entry of the railway car into the second track section.

When the railway car, or more particularly the leading pair of wheels of the car, enters the second track section, that track circuit is shunted and relay 2T is deenergized and releases. Release of relay 2T immediately deenergizes relay 1SU by opening front contact 15 of relay 2T, and relay 1SU releases, being biased to occupy its reverse position. The stick circuit for relay PCDR is also opened at said front contact 15 of relay 2T, and the armature of relay PCDR, also a biased relay, returns to its reverse position. The opening of normal contacts 23 and 26 of relay PCDR removes the alternating current energy from the pair of half step relays PNX and NPX so that their operation ceases. Opening of normal contact 25 of relay PCDR deenergizes relay PNCDPR, and aided by reactor 35, this biased relay quickly releases. The closing of reverse contacts 12, 13, and 14 of relay PNCDPR again supplies direct current energy to each of the relays PNX and NPX over circuits previously described. These relays then move their armatures to their normal position to reset for the next period of time measuring. Also, the release of relay 1SU removes energy from the counting relay chain unit CRC and its relay chains are reset ready to measure a new period of time.

When relay 1SU releases, direct current energy is supplied to relay 2SU through a circuit passing from terminal B of the source over front contacts 15 of relays 7T to 3T, inclusive, back contact 15 of relay 2T, both windings of relay 2SU in series, reverse contact 36 of relay 1SU, wire 17, the circuits in the counting relay chains of the unit CRC, and the winding of relay 1U to terminal N of the source. Flow of current through each winding of relay 2SU is from left to right and the relay operates its armature to its normal position. This action supplies alternating current energy to relays PCDR and NCDR, over the circuit as described previously when relay 1SU closed its normal contacts, except that normal contact 37 of relay 2SU is substituted in this circuit for normal contact 20 of relay 1SU.

If we assume, however, that now the initial half cycle of alternating current is a "negative half cycle," the flow of current will be from left to right in the winding of relay NCDR, but from right to left in the winding of relay PCDR, since terminal NX of the source is positive. Relay NCDR thus operates its armature to close its normal contacts while relay PCDR is retained in its reverse position. The direct current energy is removed from relays NPX and PNX by the opening of reverse contact 11 of relay NCDR, while opening reverse contact 22 of relay NCDR removes the alternating current energy from relay PCDR, and prevents its operation during this timing period. When relay NCDR operates, a direct current stick circuit is completed from terminal B of the source over front contacts 15 of relays 7T to 3T, inclusive, back contact 15 of relay 2T, the windings of relay 2SU, reverse contact 36 of relay 1SU, normal contact 38 of relay 2SU, the lower winding of relay NCDR in the direction left to right, reverse contact 25 of relay PCDR, and normal contact 39 of relay NCDR to terminal N of the source. Relay PNCDPR is also energized, so that it operates its armature to its normal position, by direct current flowing through a circuit passing from terminal B of the source through the winding of relay PNCDPR in the direction from left to right, and normal contact 39 of relay NCDR to terminal N of the source. Relay PNCDPR operating to its normal position again opens circuits from both the positive and negative terminals of the direct current source to the relays PNX and NPX as previously described. However, these relays remain in their normal positions.

During the remainder of this initial half cycle of alternating current, energy may be supplied to relay NPX through a circuit traced from terminal NX of the source over normal contact 22 of relay NCDR, wire 27, the lower winding of relay NPX, normal contact 28 of relay PNX, rectifier 29 in its forward direction, wire 30, and normal contact 40 of relay NCDR to terminal BX of the source. However, any current flowing through the relay winding is in the direction from left to right which retains this relay in the normal position. Effective with the second half cycle, which is a "positive half cycle," and with each half cycle thereafter, alternating current energy is supplied, as long as relay 2SU remains energized, to alternately operate the relays PNX and NPX on alternate half cycles of the alternating current, with relay PNX operating first on the second half cycle. The circuits over which this alternating current energy is supplied are similar to those described previously when relay PCDR was in its normal position, with the exception that normal contacts 22 and 40 of relay NCDR are substituted for normal contacts 26 and 23, respectively, of relay PCDR in these circuits. With this substitution, the circuits should be obvious with reference to Fig. 1.

As thus described, the arrangement of apparatus shown in Fig. 1 will assure that operation of the pair of half step relays to repeat the cycles of the alternating current will begin on the second complete half cycle after the initiating relay picks up to start a new period of time measuring. Also, this arrangement assures that a selected one of the pair of half step relays, as described here, the relay PNX, will always be the first to operate. Use of this relay to activate the counting chain relays will result in a continuation of the action of the counting chain as soon as the cycle repeater begins to operate. As was described, the first relay of the counting chain operates simultaneously with the initiating relay. Thus the time lost in each period of time measuring consists only of the interval required to get the cycle repeater in operation. Since it is unlikely that the cycle detecting relays will operate if energized during the latter portion of a half cycle when the current is declining, the time lost between the operation of the initiating relay and the relay PNX may vary from one half cycle to nearly three quarters cycle of the alternating current. When the usual well-known frequency of 60 cycles per second is used, this loss of time varies from slightly greater than 8 milliseconds to about 12.5 milliseconds, or a variation of about 4 milliseconds. This variation is so very small that it can be neglected and the error considered to be a constant half cycle of the alternating current, or, let us say, 8 milliseconds when the frequency of 60 cycles per second is used.

While the arrangement in Fig. 1 does not completely eliminate all error in measuring time, it is a definite improvement over the original system disclosed in Patent No. 2,320,802, previously mentioned. Since the time lost at the beginning of each period of time measuring can be considered a constant amount, the result can be compensated, if so desired, for this known error.

In Fig. 2, a modified arrangement of apparatus is shown. The portion which comprises my invention consists principally of the relay SUPR, its control circuits, and the circuits associated with it which reset the cycle repeater relays and apply alternating current energy to them. The relay SUPR, a neutral type relay, is a repeater relay of either relay 1SU or relay 2SU. When the apparatus is not measuring speed, direct current energy supplied through a circuit running from terminal B of the source over back contact 41 of relay SUPR, through the upper winding of relay PNX from left to right, wire 27, and over back contact 42 of relay SUPR to terminal N of the source resets or holds relay PNX in its normal position. Similarly, direct current energy in another circuit traced from terminal B of the source over back contact 43 of relay SUPR, through the upper winding of relay NPX from left to right, wire 27, and over back contact 42 of relay SUPR to terminal N of the source resets or holds relay NPX in its normal position.

If we again assume that a railway car enters the first track section so that the track circuit is shunted, relay 1T will be deenergized and will release. Direct current energy will be supplied then to relay 1SU through a circuit traced from terminal B of the source over front contacts 15 of relays 7T to 2T inclusive, back contact 15 of relay 1T, both windings in series of relay 1SU in the direction left to right, reverse contact 16 of relay 2SU, and wire 17 to circuits in the counting relay chains unit CRC, including the winding of relay 1U to terminal N of the source. The current through the windings of relay 1SU is in the proper direction to cause this relay to operate its armature to its normal position, closing its normal contacts. Energy is then supplied through a circuit passing from terminal B of the source over front contacts 15 of relays 7T to 2T inclusive, back contact 15 of relay 1T, normal contact 44 of relay 1SU, and the winding of relay SUPR to terminal N of the source. Relay SUPR, thus energized, picks up.

When relay SUPR picks up, the direct current resetting and retaining circuits for relays PNX and NPX are opened at back contacts 41, 42, and 43, respectively, of this relay. However, relays PNX and NPX, being magnetic stick relays, remain in their normal position. Alternating current energy is then supplied to this pair of relays from terminals BX and NX of the source over front contacts 45 and 46, respectively, of relay SUPR.

If the first half cycle of the alternating current after operation of the relay SUPR is a "positive half cycle," current will flow through the circuit passing from terminal BX of the source over front contact 45 of relay SUPR, wire 30, rectifier 31, in the forward direction, normal contact 32 of relay NPX, the lower winding of relay PNX in the direction right to left, wire 27, and front contact 46 of relay SUPR to terminal NX of the source. Relay PNX would then operate its armature to its reverse position, since the described flow of current is in the proper direction to cause this action. On the next half cycle, current will flow in a circuit traced from terminal NX of the source, over front contact 46 of relay SUPR, wire 27, the upper winding of relay NPX in the direction from right to left, reverse contact 33 of relay PNX, rectifier 29 in its forward direction, wire 30, and front contact 45 of relay SUPR to terminal BX of the source. Relay NPX then operates its armature to its reverse position. On succeeding half cycles of the alternating current energy, supplied as long as relay SUPR remains up, relays PNX and NPX will operate alternately on alternate half cycles in a manner previously described during the discussion of the operation of apparatus shown in Fig. 1. The circuits over which current flows during each half cycle are similar to those just described for the first and second half cycles and are obvious by reference to the drawing.

If the first half cycle of the alternating current energy after relay SUPR has operated is a "negative half cycle," current will flow in an obvious circuit traced from terminal NX of the source at contact 46 of relay SUPR through wire 27, the lower winding of relay NPX in the direction left to right normal contact 28 of relay PNX, rectifier 29 in its forward direction, wire 30, and front contact 45 of relay SUPR to terminal BX. Since relay NPX is already in its normal position, this current flow merely retains the armature and no operation will occur during this half cycle. During the next or positive half cycle, relay PNX will operate, as it will be energized by a current flow identical with that previously described when the initial half cycle was positive. Thereafter, the alternate operation of the relays on alternate half cycles of the alternating current will continue for the duration of the timing period.

When the leading pair of wheels of the car occupy the second track section shunting its track circuit and deenergizing relay 2T, release of relay 2T and the resultant opening of its front contact 15 deenergizes both relays 1SU and SUPR, which release. Release of relay SUPR removes the alternating current energy from the relays PNX and NPX, by the opening of front contacts 45 and 46, and reapplies the direct current energy over circuits previously described, when back contacts 41, 42, and 43 close. Relays PNX and NPX, when supplied with this direct current energy, operate their armatures to the normal position if not already occupying that position and hold with their normal contacts closed.

Closing of back contacts of relay 2T supplies direct current energy to relay 2SU as soon as relay 1SU has released and closed its reverse contacts, through a circuit passing from terminal B of the source over front contacts 15 of relays 7T to 3T, inclusive, back contact 15 of relay 2T, through both windings of relay 2SU in series in the direction from left to right, over reverse contact 36 of relay 1SU, wire 17, and through circuits of the counting chains unit CRC, including the winding of relay 1U, to terminal N of the source. Operation of the armature of relay 2SU to its normal position and the closing of its normal contacts completes a circuit to supply direct current energy to relay SUPR traced from terminal B of the source over contacts of track relays as just described, normal contact 47 of relay 2SU and the winding of relay SUPR to terminal N of the source. When relay SUPR again picks up, the actions of this relay and of relays PNX and NPX are as previously described when relay SUPR picked up repeating relay 1SU.

Thus with the arrangement of apparatus as shown in Fig. 2, relay PNX of the pair of half step relays will always operate first. Operation will always begin within the first complete cycle after the alternating current is applied to the pair of relays and may begin within a half cycle.

Having thus described two forms of apparatus embodying my invention, it will be seen that none of the advantages noted for the original arrangement for time measuring disclosed in said Letters Patent of the United States No. 2,320,802 has been lost. In addition my invention will add the advantage of assuring that the time lost at the beginning of the period of time measuring will not exceed 17 milliseconds, or the time of one complete cycle of the alternating current if a frequency other than 60 cycles per second is used. If the arrangement as shown in Fig. 1 is used, time lost at the beginning of each of several successive periods of time measurement will be the same and will not exceed the time of one-half cycle of the alternating current energy used.

Although I have herein shown and described only two forms of apparatus for an alternating current cycle repeater for time measuring embodying my invention, it is understood that various changes and modifications may be made therein within the scope of the appended claims without departing from the spirit and scope of my invention.

Having thus described my invention, what I claim is:

1. In apparatus for measuring the speed of a vehicle, comprising an initiating relay responsive to an external action of said vehicle, a source of constant frequency alternating current, a pair of half step relays each operable to a normal and a reverse position and interconnected to operate alternately on alternate half cycles of said alternating current when connected to said source, a chain of counting relays responsive successively to said operation of a particular one of said pair of half step relays; means to reset said pair of half step relays to their normal position after each period of operation and to connect said pair of relays to said source of alternating current during a first half cycle of the current after said initiating relay operates to set said apparatus into operation; said means comprising, a repeater relay, responsive to operation of said initiating relay, biased to a first position when deenergized and immediately operating to a second position when energized, a direct current source, circuits including contacts of said repeater relay in their first position, said direct current source, and windings of both of said pair of half step relays to cause said pair of half step relays to operate to said normal position, and circuits including contacts of said repeater relay in their second position to connect said pair of half step relays to said source of constant frequency alternating current.

2. In combination, an initiating relay biased to a first position and operable to a second position in response to an external action to start a period of time measuring; a repeater relay of said initiating relay, said repeater relay being biased to a first position when deenergized and occupying a second position immediately when energized; means for at times energizing said repeater relay over a second position contact of said initiating relay; a source of constant frequency alternating current; a source of direct current; a pair of half step relays of the magnetic stick type connected at times to said source of alternating current in a manner to alternately operate on alternate half cycles of said alternating current; timing means responsive to successive operations of a particular one of said pair of half step relays to count the cycles of said alternating current; circuits including said source of direct current, first position contacts of said repeater relay, and windings of both of said half step relays to reset said pair of half step relays to an identical initial position after each period of operation; and other circuits including said source of constant frequency alternating current and second position contacts of said repeater relay to connect said pair of half step relays to said source of constant frequency alternating current, said repeater relay being effective to close said other circuits during the first half cycle of said alternating current after said initiating relay operates to start a new period of time measuring.

3. In apparatus for measuring the speed of a vehicle including an initiating relay, energized while said vehicle is traversing a fixed distance, to initiate the operation of a pair of half step relays of the magnetic stick type by causing said pair of relays to be connected to a source of constant frequency alternating current, said pair of relays being interconnected and poled for one relay to operate on one half cycle and the other relay to operate on the other half cycle of said alternating current, said apparatus also including timing means for counting the operation of a selected one of said pair of relays; and means to assure that operation of said pair of half step relays starts by the end of the first cycle of said alternating current, regardless of the relative polarity of the initial half cycle, after said initiating relay initiates operation of said apparatus; said means comprising a source of direct current, a repeater relay of said initiating relay which is picked up or released according as said initiating relay is energized or deenergized, circuit means including said direct current source and back contacts of said repeater relay connected to the windings of said pair of relays, said direct current source poled to energize each of said pair of relays at a polarity which operates each relay to a selected position, and other circuit means including front contacts of said repeater relay to connect said pair of relays to said source of constant frequency alternating current.

4. In combination with apparatus for measuring the speed of a vehicle, including an initiating relay which is energized while said vehicle is traversing a fixed distance and which then initiates operation of said apparatus, a pair of relays connected at times to a source of constant frequency alternating current, said pair of relays operating alternately on alternate half cycles of said alternating current, and a chain of relays for counting the operations of a selected one of said pair of relays; the combination comprising means to assure that operation of said pair of relays begins within a complete cycle of said alternating current after said initiating relay initiates operation of said apparatus, said means comprising, a source of direct current, another relay, a pickup circuit for said other relay including energized position contacts of said initiating relay and said direct current source, said other relay being effective when energized to connect said pair of relays to said source of alternating current and when deenergized to said source of direct current in such a manner as to reset said pair of relays to a normal position after each period of operation so that they are conditioned to operate within said first complete cycle of said alternating current during each period of operation.

5. In apparatus for measuring the speed of a vehicle, including a source of constant frequency alternating current, a pair of half step relays interconnected and connected to said source of alternating current in such a manner that they alternately operate on alternate half cycles of said alternating current, and a counting chain of relays which are successively connected to a source of current by a selected one of said half step relays to count the cycles of said alternating current; the combination comprising an initiating relay energized and operated to an operated position while said vehicle is traversing a fixed distance, a pair of biased detector relays, a source of direct current, a pickup circuit for each said detector relay; each said pickup circuit including said alternating current source, an operated position contact of said initiating relay, and a biased position contact of the other detector relay; a stick circuit for each said detector relay including said direct current source, a biased position contact of the other detector relay, and a normal position contact of said detector relay; a reset circuit means for said half step relays including said direct current source and a biased position contact of each of said detector relays; and an operating circuit means for said half step relays including said constant frequency alternating current source and normal position contacts in multiple of said detector relays.

6. In apparatus for measuring the speed of a vehicle, including a source of constant frequency alternating current, a pair of half step relays interconnected and connected to said source of alternating current in such a manner that they alternately operate on the alternate half cycles of said alternating current, and a counting chain of relays which are successively connected to a source of current by a selected one of said half step relays to count the cycles of said alternating current; the combination comprising, an initiating relay adapted to be energized and operated to an operated position while said vehicle is traversing a fixed distance, a pair of biased detector relays, a source of direct current, a pickup circuit for each said detector relay; each said pickup circuit including said alternating current source, an operated position contact of said initiating relay, and a biased position contact of the other detector relay, a stick circuit for each said detector relay including said direct current source, a biased position contact of the other detector relay, and a normal position contact of said detector relay; and an operating circuit means for said half step relays including said constant frequency alternating current source and normal position contacts in multiple of said detector relays.

7. In combination, for measuring a period of time, a source of constant frequency alternating current; a pair of half step relays of the magnetic stick type, each said relay being connected by a circuit means, which includes contacts of the other relay of said pair and a rectifier, so poled that said pair of relays alternately operate on alternate half cycles of said alternating current when connected to said source of alternating current; an initiating contact adapted to be closed at times for a time interval determined by an external action; a source of direct current; a pair of detector relays of the biased type; a pickup circuit for each said detector relay, each said pickup circuit including said alternating current source, said initiating contact in its closed position, and a biased position contact of the other detector relay, whereby said detector relays are selectively operated according to the polarity of the first half cycle of said alternating current after said initiating contact is closed; a stick circuit for each said detector relay including said direct current source, a biased position contact of the other detector relay, and an operated position contact of said detector relay; an operating circuit means including operated position contacts of said selectively operated detector relay to connect said pair of half step relays to said constant frequency alternating current source; an electrical time measuring means; another circuit including a normal contact and a reverse contact of a selected one of said half step relays to successively connect said direct current source to said time measuring means; and a reset circuit means including said direct current source and a biased position contact of each of said detector relays to reset said half step relays to a selected position at the end of a timing period as determined by the opening of said initiating contact, whereby said half step relays are conditioned to begin operation during the second half cycle of said alternating current after said initiating contact is closed.

8. In combination; an initiating relay biased to a first position and operable to a second position in response to the entry of a vehicle into a fixed distance to initiate the action of measuring the speed of said vehicle through said fixed distance; a source of constant frequency alternating current; a source of direct current; a pair of half step relays of the magnetic stick type each operable to a normal and a reverse position; interconnecting circuit means for said pair of relays so poled that, if said pair of relays and said interconnecting circuit means are connected to any source of alternating current, a first relay of said pair operates on one half cycle of said alternating current and a second relay of said pair operates on the other half cycle of said alternating current; timing means responsive to the operation of a selected one of said pair of half step relays; two repeater relays of the biased type responsive to operation of said initiating relay, each repeater relay biased to a first position which it occupies when deenergized and operable to a second position which it occupies only when energized by current of the proper direction; circuits controlled by second position contacts of said initiating relay to connect said source of constant frequency alternating current to said repeater relays to cause one of said repeater relays to occupy its second position when the initial half cycle of said alternating current is of a relative positive polarity, and to cause the other of said repeater relays to occupy its second position if said initial half cycle of said alternating current is of a relative negative polarity; reset circuits controlled by first position contacts of said repeater relays and including said source of direct current and a winding of each of said pair of half step relays, said reset circuits being so poled that said pair of half step relays is operated to said normal position at the end of each period of operation; operating circuits controlled by second position contacts of said repeater relays to connect said pair of half step relays to said source of constant frequency alternating current, said operating circuits being so poled that said first relay of said pair of half step relays, having been reset to their normal position, will always operate on the second complete half cycle of said constant frequency alternating current after said initiating relay has operated, regardless of relative polarity of said initial half cycle.

9. In combination with apparatus for repeatedly measuring the speed of a railway car traversing a stretch of track comprising a series of track sections formed in said stretch, said sections being of such length that only one pair of wheels of said car can occupy a section at a time, each section having a track circuit including rails of said section, a source of track current, and a track relay; said track relay being normally energized and becoming deenergized as said section is occupied by a leading pair of wheels of said car, said apparatus including a time measuring means and initiating relays, operable in response to the successive release of said track relays, to initiate repeated operation of said time measuring means, said time measuring means comprising a source of constant frequency alternating current, a pair of half step relays which alternately operate on alternate half cycles of said alternating current supplied by said constant frequency source, and a chain of counting relays which pick up successively in response to operation of a particular one of said pair of half step relays to count the elapsed cycles of said alternating current; means to assure that a first relay of said pair of half step relays operates during the second half cycle of said alternating current after said alternating current source is connected to said time measuring means so that said measurement of speed will be accurate; said means comprising a source of direct current, three relays of the biased type, circuit means to connect said three relays to said sources of alternating current and direct current respectively; said circuit means also including operated position contacts of said initiating relays, and contacts of said three relays interconnected so that only two of said three relays occupy their operated position during the period said leading pair of wheels of said railway car occupies one of said track sections; reset circuit means including said direct current source and biased position contacts of said three relays to cause said half step relays to operate to occupy a selected initial position at the end of each period of operation, operating circuit means including said alternating current source and operated position contacts of one of said three relays to connect said half step relays to said source of alternating current so poled that said first relay of said half step relays, which are occupying said selected initial position, will operate during said second half cycle of said alternating current after operated position contacts of any one of said initiating relays are closed.

10. In combination, for repeatedly measuring the speed of a railway car traversing a stretch of railway track, said stretch comprising a series of track sections each being of such length that only one pair of wheels of said car can occupy any section at one time, each said section having a track circuit including the rails of said section, a source of track current, and a track relay; said track relay being normally energized and becoming deenergized as said section is occupied by a leading pair of wheels of said car; two initiating relays biased to a released position and operable to an operated position alternately in response to the successive release of said track relays as said car successively occupies said track sections; a source of constant frequency alternating current, a source of direct current, a pair of half step relays of the magnetic stick type, circuit means to interconnect said half step relays so that they alternately operate on alternate half cycles of said alternating current when connected to said alternating current source, two cycle detector relays of the biased type, an operated position repeater relay, of the biased type, of either of said cycle detector relays; a pickup circuit for each said detector relay, each pickup circuit including said source of alternating current, a biased position contact of said repeater relay, an operated position contact in multiple of each of said initiating relays, and a biased position contact of the other detector relay; said pickup circuits being so poled that one or the other of said detector relays is selectively operated according as a first half cycle of said alternating current, after one of said initiating relays closes its operated position contact, is positive or negative respectively; a stick circuit for each said detector relay, including said direct current source, an operated position contact in multiple of each of said initiating relays, a biased position contact of the other detector relay, and an operated position contact of said each detector relay; a reset circuit for said half step relays, including said direct current source and biased position contacts of each of said detector relays and said repeater relay, to operate said half step relays to a selected initial position at the end of each period of operation; an operating circuit for said half step relays, including said alternating current source, operated position contacts of said selectively operated detector relay, and said interconnecting circuit means so that said half step relays always begin operation during a second half cycle of said alternating current after said operated position contacts of said initiating relay are closed, with a particular one of said half step relays operating first; a timing means, and a circuit including said direct current source and contacts of said particular half step relay to successively activate said timing means to count the cycles of said alternating current during the time said leading pair of wheels of said car occupies each said track section, whereby the speed of said car may be accurately determined.

References Cited in the file of this patent
UNITED STATES PATENTS

| | | |
|---|---|---|
| 2,189,879 | Brown | Feb. 13, 1940 |
| 2,320,802 | Snaveley | June 1, 1943 |
| 2,346,869 | Poole | Apr. 18, 1944 |
| 2,588,005 | Howard | Mar. 4, 1952 |
| 2,600,729 | Boyer et al. | June 17, 1952 |